US010666792B1

(12) United States Patent
Marzuoli et al.

(10) Patent No.: US 10,666,792 B1
(45) Date of Patent: May 26, 2020

(54) APPARATUS AND METHOD FOR DETECTING NEW CALLS FROM A KNOWN ROBOCALLER AND IDENTIFYING RELATIONSHIPS AMONG TELEPHONE CALLS

(71) Applicant: PINDROP SECURITY, INC., Atlanta, GA (US)

(72) Inventors: Aude Marzuoli, Atlanta, GA (US); Hassan Kingravi, Atlanta, GA (US); David Dewey, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 881 days.

(21) Appl. No.: 15/217,780

(22) Filed: Jul. 22, 2016

(51) Int. Cl.
| | |
|---|---|
| *H04M 3/22* | (2006.01) |
| *H04L 29/08* | (2006.01) |
| *H04M 7/00* | (2006.01) |
| *G10L 15/26* | (2006.01) |
| *G06N 20/00* | (2019.01) |
| *G06F 16/35* | (2019.01) |
| *G06F 16/61* | (2019.01) |

(52) U.S. Cl.
CPC .......... *H04M 3/2281* (2013.01); *G06F 16/35* (2019.01); *G06F 16/61* (2019.01); *G06N 20/00* (2019.01); *G10L 15/26* (2013.01); *H04L 67/2804* (2013.01); *H04M 7/006* (2013.01)

(58) Field of Classification Search
CPC ..... H04M 3/2281; H04M 7/006; G06F 16/35; G06F 16/61; G06N 20/00; G10L 15/26; H04L 67/2804

USPC ........................................................... 706/12
See application file for complete search history.

(56) References Cited

U.S. PATENT DOCUMENTS

| | | | | |
|---|---|---|---|---|
| 8,386,377 | B1 * | 2/2013 | Xiong | G06Q 20/04 |
| | | | | 455/550.1 |
| 8,458,268 | B1 * | 6/2013 | Cooley | G06Q 10/107 |
| | | | | 709/206 |
| 9,584,658 | B2 * | 2/2017 | Cohen | H04M 3/436 |
| 2008/0084975 | A1 * | 4/2008 | Schwartz | H04M 3/436 |
| | | | | 379/88.22 |

(Continued)

OTHER PUBLICATIONS

Gupta et al., "Phoneypot: Data-driven Understanding of Telephony Threats" Feb. 8-11, 2015, NDSS '15, pp. 1-14. (Year: 2015).*

(Continued)

*Primary Examiner* — Vincent Gonzales
*Assistant Examiner* — Chase P. Hinckley
(74) *Attorney, Agent, or Firm* — Eric L. Sophir; Foley & Lardner LLP (57) ABSTRACT

Methods and systems for detecting new calls from an existing spam or robocaller and aggregating calls that originate from the same infrastructure using a telephony honeypot are disclosed. An example method may receive a telephone call to a telephony honeypot and store metadata and a call audio recording associated with the telephone call. A transcript may be created of the call audio recording. Audio features may be extracted from the call audio recording. The transcript may be compared to other previously-received transcripts in order to determine a similarity between the call and previously-received calls. Audio features and metadata may also be compared to determine whether the call is similar to other previously-received calls. If a call is similar, the call may be identified with the same spam campaign or robocaller as the similar, previously-received call.

23 Claims, 7 Drawing Sheets

(56) References Cited

U.S. PATENT DOCUMENTS

| | | | | |
|---|---|---|---|---|
| 2008/0181390 | A1* | 7/2008 | Kummamuru | G06F 16/685 379/265.06 |
| 2009/0132252 | A1* | 5/2009 | Malioutov | G06F 16/685 704/258 |
| 2012/0167208 | A1* | 6/2012 | Buford | H04L 63/1491 726/22 |
| 2013/0109358 | A1* | 5/2013 | Balasubramaniyan | H04W 24/08 455/411 |
| 2013/0326625 | A1* | 12/2013 | Anderson | G06F 21/56 726/23 |
| 2014/0207783 | A1* | 7/2014 | Ravid | G06F 16/288 707/739 |
| 2015/0025887 | A1* | 1/2015 | Sidi | G10L 17/02 704/245 |
| 2015/0172300 | A1* | 6/2015 | Cochenour | H04L 63/145 726/23 |
| 2015/0365530 | A1* | 12/2015 | Kolbegger | G10L 25/93 379/88.01 |
| 2016/0309024 | A1* | 10/2016 | Quilici | H04M 3/436 |
| 2017/0310691 | A1* | 10/2017 | Vasseur | H04L 41/147 |

OTHER PUBLICATIONS

Balasubramaniyan et al., "PinDr0p: Using Single-Ended Audio Features to Determine Call Provenance" Oct. 2010, CCS '10, pp. 109-120. (Year: 2010).*

Ezzat el al., "Investigating Analysis of Speech Content through Text Classification" Dec. 7-10, 2010 International Conference of Soft Computing and Pattern Recognition, pp. 105-110 (Year: 2010).*

Tu et al., "SoK: Everyone Hates Robocalls: A Survey of Techniques against Telephone Spam" 2016 IEEE Symposium on Security and Privacy, pp. 320-338 (Year: 2016).*

Tseng et al., "FrauDetector: A Graph-Mining-based Framework for Fraudulent Phone Call Detection" Aug. 11-14, 2015, KDD'15, pp. 2157-2166. (Year: 2015).*

Smith, Scott "Catching Flies: A Guide to the Various Flavors of Honeypots" Apr. 12, 2016, SANS Institute (Year: 2016).*

Fodeh et al., "Combining Statistics and Semantics via Ensemble Model for Document Clustering" Mar. 8-12, 2009, SAC'09. (Year: 2009).*

Qian et al., "A Case for Unsupervised-Learning-based Spam Filtering" Jun. 14, 2010 SIGMETRICS '10 Proceedings of the ACM SIGMETRICS International conference on Measurement and modeling of computer systems, pp. 1-17. (Year: 2010).*

Gruber et al., "Global VoIP Security Threats—Large Scale Validation Based on Independent Honeynets" May 20-22, 2015, IFIP Networking Conference. (Year: 2015).*

Wu et al., "Spam Detection in Voice-over-IP Calls through Semi-Supervised Clustering" Jun. 29-Jul. 2, 2009, IEEE/IFIP International Conference on Dependable Systems & Networks, pp. 307-316. (Year: 2009).*

Sasaki et al., "Spam Detection Using Text Clustering" Dec. 2005. (Year: 2005).*

* cited by examiner

| Topic Number | Topic | Topic words |
| --- | --- | --- |
| Topic 1 | Business Listing Scam | front, page, business, position, locally, searching, unlimited |
| Topic 2 | Healthcare Scam | effective, missed, period, cover, often, law, during, future, avoid |
| Topic 3 | Social Media Scam | Authenticate, listing, register, particular, brought, profile, critical |
| Topic 4 | Bahamas Cruise Scam | cruise, survey, bahamas, awarded, correctly, complimentary, participate, end, included, received |
| Topic 5 | Loans and Credit Lines Scams | Learn, care, new, help, qualify, federal, credit, pay, plan, benefit |

APPARATUS AND METHOD FOR DETECTING NEW CALLS FROM A KNOWN ROBOCALLER AND IDENTIFYING RELATIONSHIPS AMONG TELEPHONE CALLS

BACKGROUND

Telephony is a universal communication technology that has undergone fundamental changes in the recent past. Many of these changes have had positive impacts on consumers' lives, but others have undermined consumers' trust in this technology. Because of technological advancements to telephony such as Voice-over-Internet-Protocol (VoIP), telephony has effectively merged with the Internet. As a result, many of the cyber threats and attacks that infiltrate the Internet also impact telephony. Robocalling, voice phishing, and caller ID spoofing are common cybercrime techniques used to launch scam campaigns through the telephony channels that unsuspecting users traditionally trust.

Multiple phone numbers are typically used by a single scammer to launch a scam campaign. However, customary machine learning techniques based on historical behavior of a phone number fail to catch these bad actors since a bad actor will typically only call a specific destination number with a certain source phone number at most a couple of times.

As recognized by the inventor, there should be a way to identify a bad actor operating several phone numbers even if each source number only calls a specific destination number one or two times.

SUMMARY

This specification describes technologies relating to scam campaigns through telephony channels in general, and specifically to systems and methods for detecting new calls from a known robocaller or spam/fraud campaign regardless of call source by examining semantics in speech and calling patterns.

In general, one aspect of the subject matter described in this specification can be embodied in a computer-implemented method or an apparatus.

According to an embodiment, the invention may include a computer-implemented method to identify relationships among telephone calls using a telephony honeypot, the computer-implemented method comprising: receiving a plurality of telephone calls to a telephony honeypot; storing metadata associated with the plurality of telephone calls; storing call recordings corresponding to the plurality of telephone calls; creating a transcript from each call recording; and analyzing the transcripts to identify call clusters based on similarity of the call transcripts.

According to other aspects of the invention the analyzing call transcripts for similarities may further include: pre-processing transcripts to filter out recordings that do not contain a pre-determined amount of semantic information; truncating the endings of words; putting the transcripts into bag-of-words faun; using a topic modeling algorithm to map each transcript to a projection in a topic space; and computing a pair-wise similarity between all pairs of transcripts to create a similarity matrix that contains a similarity score between each pair of transcripts.

According to further aspects of the invention, the computing step computes the pair-wise similarity between all pairs of transcripts to create a similarity matrix that contains a similarity score between each pair of transcripts as the cosine of the projections, which are normalized According to yet further aspects of the invention, the call clusters may be further identified using clustering techniques to identify related calls.

According to still further aspects of the invention, the clustering technique may be spectral clustering.

According to other aspects of the invention, method may further include creating a positive class with the audio features for the call cluster; creating a negative class with the audio features from any other calls not in the call cluster; training a machine learning classifier to build a model of the call cluster using their audio features; and classifying new telephone calls as belonging to the positive class of the model.

According to still further aspects of the invention, a library of machine learning models are built and maintained for scam and robocallers.

According to another embodiment of the invention, a computer-implemented method for detecting new calls from an existing spam or robocaller, may include the following steps: receiving a telephone call to a telephony honeypot; extracting call audio features from a call audio associated with a telephone call; classifying the call based on the call audio features using at least one machine learning model; and responsive to said classifying, identifying that the telephone call and at least one previously-received call are from the same spam campaign or robocaller.

According to other aspects of the invention, the method may further include storing metadata associated with the telephone call; and storing a call audio recording associated with the telephone call; and the classifying step compares the audio features and metadata from the telephone call with the at least one machine learning model.

In further aspects of the invention, the audio features extracted and compared include noise, spectrum, and VoIP packet loss audio features.

In yet further aspects of the invention, the method may further include extracting audio features from each call recording; analyzing call transcripts for similarities; said identifying step combining similarity of call transcripts, metadata, semantic information, and audio features to create the call clusters; and phoneprinting the calls in at least one of the call clusters.

In still further aspects of the invention, the method may also include using the phoneprints on call clusters to determine telephone calls that originate from the same infrastructure.

In another embodiment of the invention, an apparatus that identifies relationships among telephone calls using a telephony honeypot may include at least one processor; and a non-transitory computer-readable medium coupled to the at least one processor having instructions stored thereon that, when executed by the at least one processor, causes the at least one processor to: receive a plurality of telephone calls to a telephony honeypot; store metadata associated with the plurality of telephone calls; store call recordings corresponding to the plurality of telephone calls; create a transcript from each call recording; and analyze the transcripts to identify call clusters based on similarity of the call transcripts.

According to other aspects of the invention, the at least one processor is further caused to perform said analyzing call transcripts for similarities by: pre-processing transcripts to filter out recordings that do not contain a pre-deteinained amount of semantic information; truncating the endings of words; putting the transcripts into bag-of-words form; using a topic modeling algorithm to map each transcript to a projection in a topic space; and computing a pair-wise similarity between all pairs of transcripts to create a similarity matrix that contains a similarity score between each pair of transcripts as the cosine of the projections, which are normalized.

According to further aspects of the invention, the at least one processor is further caused to further identify call clusters using clustering techniques to identify related calls.

According to still further aspects of the invention, t the clustering technique may be spectral clustering.

According to yet still further aspects of the invention, the at least one processor is further caused to: create a positive class with the audio features for the call cluster; create a negative class with the audio features from any other calls not in the call cluster; train a machine learning classifier to build a model of the call cluster using their audio features; and classify new telephone calls as belonging to the positive class of the model.

According to other aspects of the invention, a library of machine learning models are built and maintained for scam and robocallers.

According to another embodiment of the invention, an apparatus for detecting new calls from an existing spam or robocaller, the apparatus including at least one processor; and a non-transitory computer-readable medium coupled to the at least one processor having instructions stored thereon that, when executed by the at least one processor, causes the at least one processor to: computer-implemented method to: receive a telephone call to a telephony honeypot; extract call audio features from a call audio associated with a telephone call; classify the call based on the call audio features using at least one machine learning model; and responsive to said classifying, identify that the telephone call and at least one previously-received call are from the same spam campaign or robocaller.

According to other aspects of the invention, the at least one processor is further caused to: store metadata associated with the telephone call; and store a call audio recording associated with the telephone call; and said classifying step comparing the audio features and metadata from the telephone call with the at least one machine learning model.

According to other aspects of the invention, the audio features extracted and compared include noise, spectrum, and VoIP packet loss audio features.

According to still other aspects of the invention, the at least one processor is further caused to: extract audio features from each call recording; analyze call transcripts for similarities; said identifying step combining similarity of call transcripts, metadata, semantic information, and audio features to create the call clusters; and phoneprinting the calls in at least one of the calls in the call cluster.

According to yet further aspects of the invention, the at least one processor is further caused to: use the phoneprints on call clusters to determine telephone calls that originate from the same infrastructure.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

DETAILED DESCRIPTION

Figure 1:
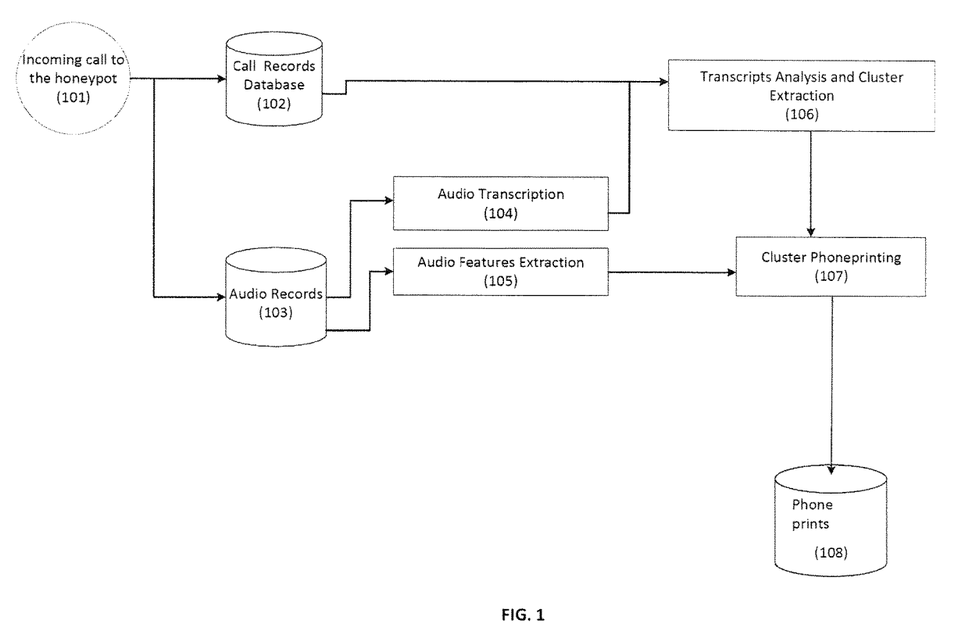
FIG. 1 is a block diagram illustrating an example of processing calls into a honeypot

According to an example embodiment, a telephony honeypot may be created to receive calls that can be analyzed for calling patterns, semantic information, and/or audio features in order to provide information regarding spam and fraud behavior in a telephony channel. An example system is illustrated in FIG. 1, which implements an example recognition apparatus by receiving an incoming call to the honeypot (101, 201)

A telephony honeypot is a telephone service endpoint to which calls can be directed. It may appear to callers to be a normal telephone number (e.g., a typical 10-digit residential or business phone number), but it is specifically designed and deployed to collect information on unwanted calls. An example telephony honeypot 101, 102 may include a communications server that has the capability to receive, make, and record calls. An example telephony honeypot might automatically process calls or use human-interaction to process calls. In some embodiments, the telephony honeypot may be computer-monitored and information from the honeypot may be recorded.

Figure 2:
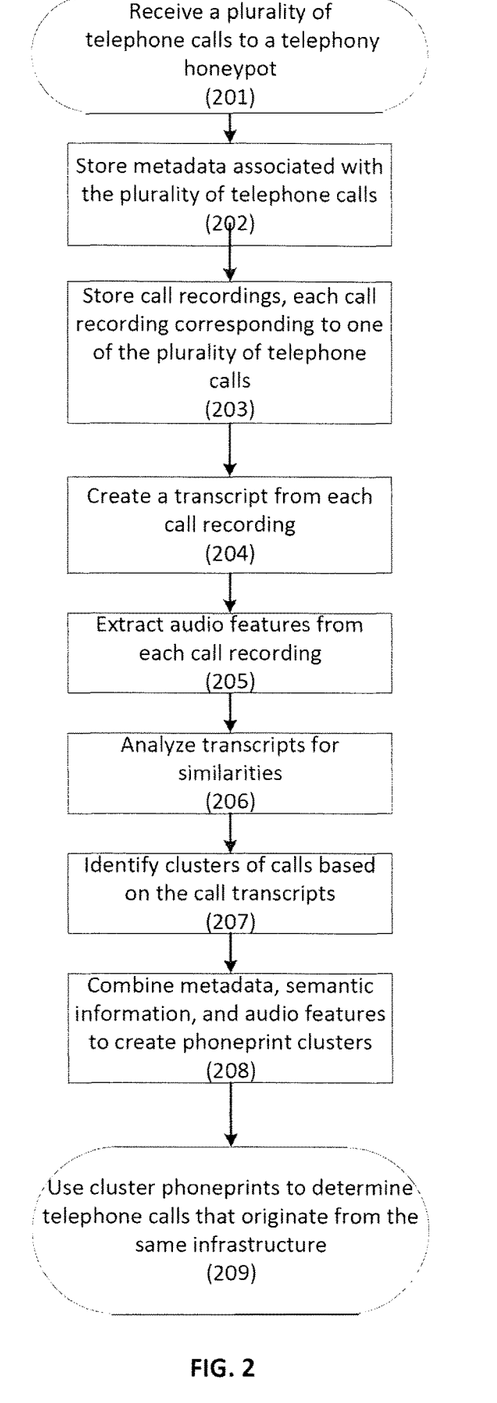
FIG. 2 is a flow diagram of an example method for automated testing of a software application using replicate markers simultaneously as primary markers.

An example telephony honeypot 101, 102 may exist in a telephony honeypot system that includes a computer system (hardware and software). An example telephone honey pot may receive and answer calls with a simple recording. When a source phone number calls a destination number in the honeypot, metadata associated with the phone call such as source number, destination number, and time of call may be stored in a call records database as illustrated in FIGS. 1 and 2 (102, 202). Call audio recordings (103, 203) may be kept in the same or a separate database. Semantic information, such as transcripts, may be extracted from the call audio recordings (104, 204). Additionally, audio features may be computed from the call audio recordings (105, 205). In some instances, metadata, semantic information, and audio features may be combined to create a phoneprint for each phone call. In at least one embodiment, a phoneprint is an audio model that uniquely identifies the telephony infrastructure used by, for example, one bad actor to conduct a given fraud or spam campaign.

Figure 3:
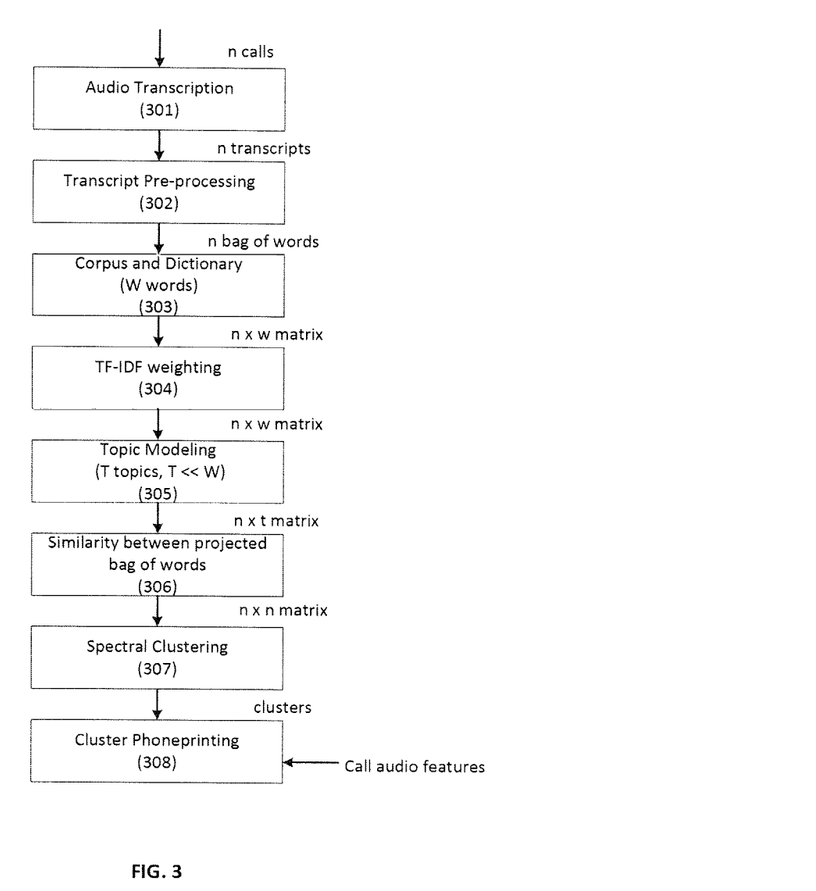
FIG. 3 is example code illustrating an example implementation of testing configuration parameters, where one marker is executing and providing live results for a software application and the other marker is executing, but providing test results for the software application.

Once a call is recorded, its audio may be transcribed using speech recognition software such as Kaldi as illustrated in FIG. 3 (301). Transcripts may then be pre-processed before applying language analysis techniques (302). Pre-processing may include filtering and deleting transcripts that do not meet certain criteria. In an example embodiment, there may be initial filtering and preprocessing before storing the transcript of a phone call. For example, to filter out recordings that do not contain enough semantic information, stop words may be removed from transcripts. Unusual words that only appear once across all documents may be removed as well. Transcripts containing few words, such as three words or less, or containing very little usable information may be discarded. The remaining words may be lemmatized, meaning that the endings of words may be truncated, and the transcripts may be put into a "bag-of-words" form in which the transcripts are stored as an unordered list of words.

A dictionary may be obtained from transcripts of recorded phone calls destined for an example honeypot (303). The dictionary may contain the unique lemmatized words that appear more or less frequently across transcripts. These unique words may be weighted according to their frequency per transcript and may be projected onto a topic space.

Call transcripts may be analyzed as illustrated in FIGS. 1 and 2 (106, 206). For example, call transcripts may be processed with a topic model. Algorithms may be used to analyze large volumes of unlabeled transcript text documents. Topic model algorithms may be used in order to analyze the call transcripts. For example, spectral algorithms such as Latent Semantic Indexing (LSI) or probabilistic algorithms may be used to analyze transcripts. These algorithms may find patterns and thematic structures in document collections in general and specifically in call transcripts in an example embodiment. Once patterns and thematic structures are determined, an example embodiment may determine topics associated with the transcripts based on the patterns and themes found within the documents. More specifically, a topic may be determined by weighting a list of all the words in the dictionary.

Latent Semantic Indexing (LSI) is a dimensionality reduction technique that projects documents and document queries into a space of dimension smaller than the original space of dictionary words in which they were expressed. In other words, instead of a transcript being represented by a weighted list of the words in the dictionary (the weights can be zero), they are represented by a weighted list of topics. Because the number of topics is much smaller than the number of words in the dictionary, this reduces the dimension of the problem.

This smaller space is called the "topic space." Topics represent a small set of independent, underlying variables that explain each query. For example, in an example embodiment, let the body of documents, the transcripts, be represented by a n×w weighted term-document matrix X, where w is the size of the dictionary (all distinct words observed in the transcripts), and n is the number of transcripts. The rows of X are the transcripts in filtered bag-of-words form and each term in the dictionary is represented by a column. A Term Frequency Inverse Document Frequency (TF-IDF) local weighting function may be applied to condition the data within the transcripts as shown in FIG. 3 (304). TF-IDF works by deteimining the relative frequency of words in a specific document (transcript) compared to the inverse proportion of that word of the entire body of documents (all transcripts). This transformation increases the weight of words that appear frequently within few documents and decreases the weight of words that appear frequently across documents.

For example, define $X_{tfidf}$ as the term-document matrix, once the TF-IDF transformation has been applied. LSI is a Singular Value Decomposition (SVD) applied to $X_{tfidf}$ where only the largest t singular values are kept and $t \ll m = \min(w, n)$. $X^t_{tfidf} = U_{w \times t} S_{t \times t} V^T_{n \times t}$ is therefore the best rank t approximation of $X_{tfidf} = U_{w \times m} S_{m \times m} V^T_{n \times m}$ in the least squares sense.

The SVD along with the reduction preserves the most important semantic information in the text of the transcripts while reducing noise and other undesirable artifacts of the original space of X. The n columns of $S_{t \times t} V^T_{n \times t}$ may be the new coordinates of each transcript after dimensionality reduction. The new coordinate system may help perform the dimensionality reduction for documents that are not in the original body of documents, instead of increasing the size of the body of documents and performing the full LSI again.

Figure 4:
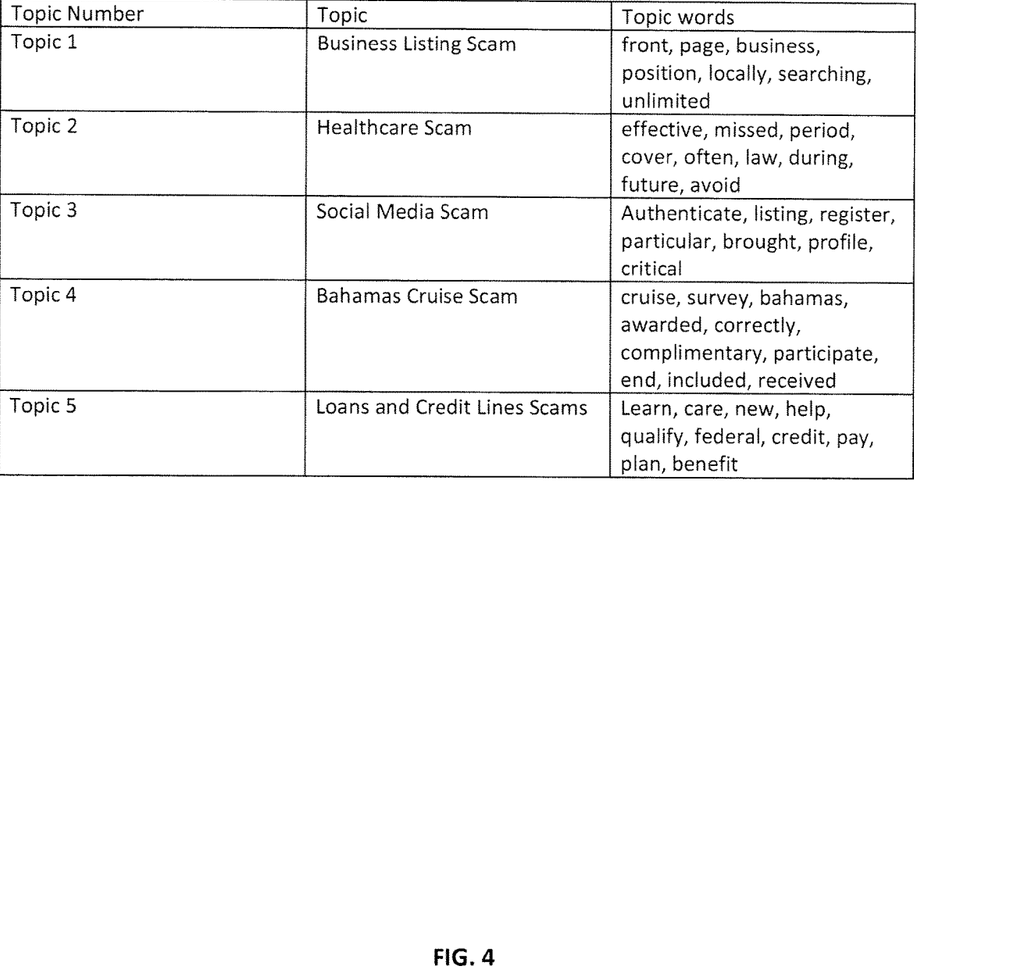
FIG. 4 is a block diagram showing an example of five topics and associated top ten words by order of decreasing weight.

The number of topics may be selected by plotting the singular values of the LSI and noticing no significant improvement after the value chosen for the number of topics. A small number of topics may ensure a smoother projection space while eliminating a large share of the noise. The space of words in the dictionary may be projected onto the space of topics, which may be 100 dimensions. The dictionary may be arranged so that the first topic is the topic corresponding to the largest singular values and reflects the most important scams in volume. For example, FIG. 4 shows an example of five topics and the associated top ten words by order of decreasing weight.

Any new transcript may be added to the present body of documents or compared against it. This process may make the honeypot searchable by keyword or sentence. The output of the topic model may be a n×t matrix, mapping each transcript to its projection in the space of topics as shown in FIG. 3 (305). Once each transcript has been mapped to a lower dimensional projection, in the space of topics, the projections can be compared. A similarity score between any pair of transcripts may be computed as the cosine of the projections, which are normalized, and thus the score takes values between 0 and 1, where 1 indicates identical projections. A n×n similarity matrix may be created, indicating a pair-wise similarity between all pairs of transcripts (306).

Figure 6:
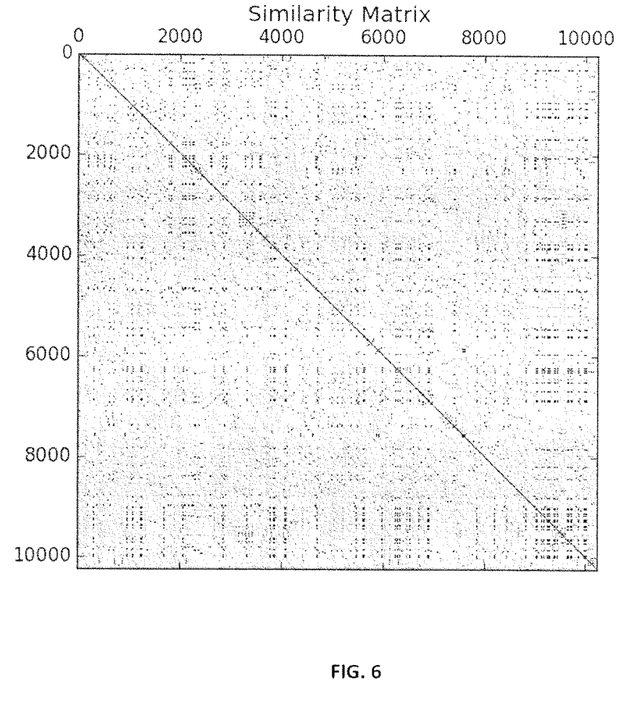
FIG. 6 is an example of a similarity matrix produced according to aspects of the invention.

An example of a similarity matrix is shown in FIG. 6. As shown therein, all elements of this matrix have values between zero and one. Each element (i,j) represent the value of a similarity metric between transcript i and transcript j. A dark dot at element (i,j) indicates that transcript i and j are identical. This similarity matrix represents the value of a similarity metric, such as cosine similarity, between any pair of transcripts. It shows at first glance that several transcripts correspond to identical recordings. However, more analysis may be required to identify entire sets of identical transcripts.

In an example embodiment, groups of transcripts may be identified that have high similarity to each other and may correspond to the same recording. For example, one recording's transcript may state the following: "Press one to say fifty percent on your electric bill with no money out of pocket using in new jersey solar company with hundreds of satisfied customers pressed to and continue paying one of the highest electric utility rates in the country and be removed from our list again press one to talk to an experience to new jersey solar representative." A second recording's transcript may state the following: "Press one to say fifty percent on your electric bill with no money out of pocket to using a new jersey's older company with hundreds of satisfied customers pressed to in continue paying one of the highest electric utility rates in the country and be removed from our list again press one to talk with an experienced in new jersey so er representative." Listening to the corresponding recordings, the recordings may be identical, but some noise in the audio of one of them may cause slight differences in the transcripts.

A third transcript may state the following: "Hi we're just doing the quick survey where you where the new jersey residence or now entitled to the rebate on their electric bills twice a year and a twenty five dollar visa gift card press one if you would be interested in learning more about this price too if you're not interested pressed three to be removed." Although this transcript comes from a different recording than the first two transcripts, there are some common keywords among all the transcripts. A pair-wise comparison between the third transcript and the first transcript may yield a 0.64 similarity score.

In order to identify groups, clusters of similar recordings may be determined. A single similarity matrix may be obtained among transcripts by computing pair-wise similarity scores across the whole body of transcripts to create a nxn matrix. Before applying a spectral clustering algorithm to the similarity matrix, the similarity of any pair of transcripts may be compared against a threshold. If the similarity of a pair of transcripts is below a given threshold, the similarity may set to zero. Experimentally, the running time of the algorithm may be faster by making the similarity matrix sparser. The number of non-zero elements in the similarity matrix may decrease without affecting the quality of the clusters. If a transcript is only highly similar to itself, it may be filtered out thereby reducing the number of rows and columns kept in the similarity matrix. Transcripts may also be sorted by length in the similarity matrix.

Figure 7:
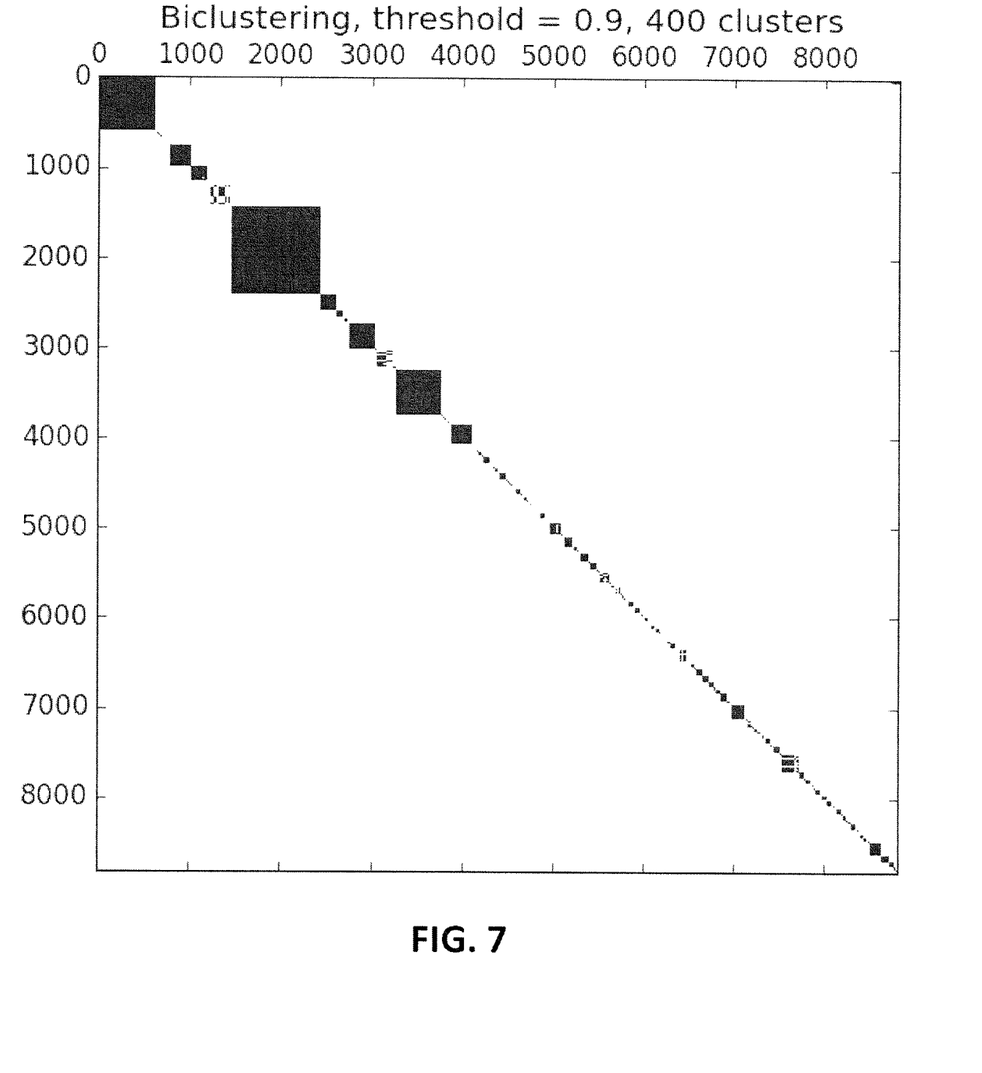
FIG. 7 is an example of a similarity matrix after filtering and clustering according to aspects of the invention.

FIG. 7 is an example of a similarity matrix after filtering and clustering according to aspects of the invention. It shows the underlying structure of the similarity matrix. Among the whole set of transcripts, several clusters each containing a subset of identical transcripts can be identified. Each row and each column of FIG. 7 corresponds to a transcript. The two main differences with FIG. 6 are as follows. In FIG. 7, the rows and columns have been permuted compared to FIG. 6, therefore allowing patterns to be identified. These patterns show which subsets of seemingly unrelated transcripts, possibly corresponding to calls from hundreds of source phone numbers, are in fact identical. Compared to FIG. 6, only strong similarity between transcripts is retained in FIG. 7, hence the filtering of low similarity values corresponding to lighter shades of black.

Clustering algorithms address the classical unsupervised learning problem of finding a partition for a given set of items for which there may be more than one way to partition the data. An example embodiment may use clustering techniques to identify call clusters that play the same recording based on the projections of their transcripts on the topic space. For example, an advanced clustering technique such as spectral clustering may be used to distinguish recordings that contain some of the same words, but that are not identical as shown in FIG. 3 (307).

Spectral clustering is a powerful, non-parametric technique to uncover structure in data using the spectrum of a pairwise similarity matrix. The spectral clustering algorithm takes as input a similarity matrix S and the number of clusters wanted, k. The algorithm then proceeds by the following steps. The Laplacian matrix L=D−A is computed, where D is the degree matrix and A is the adjacency matrix of the similarity graph. The first k eigenvectors v1, v2, . . . vk of the Laplacian matrix L are calculated. The matrix V=[v1, . . . vk], of the top eigevectors as columns, is then computed and the rows of V are used as new data points in Rk. Finally, k-means clusterings is applied to the rows of V. Spectral clustering works well in practice because the data is projected into a lower-dimensional space, the spectral domain, where it is easily separable with k-means. K-means on the Laplacian eigenvectors enables the separation of clusters with non-convex boundaries. The most stable clustering is usually given by the value of k that maximizes the eignegap (i.e. the difference between consecutive eigenvalues). The clusters may be automatically extracted and their average intra-cluster similarity determines if the calls are clustered as illustrated in FIG. 2 (207). The audio signal may not be enough by itself to identify calls playing identical recordings and may not provide semantic information as to which spam and scam campaigns are being run.

An example embodiment may use spectral clustering on the similarity matrix between transcripts, clusters of transcripts, and audio recordings. Clusters of recordings may lead to clusters of phone numbers (aka call clusters). Semantic information provided by call recordings suggest that several source phone numbers may be tied to the same spam or scam campaign. An audio signature of a given telephony infrastructure can be uniquely identified and modeled with a classifier, or "phoneprint." There are multiple features of audio samples that are sufficient to uniquely identify a telephony infrastructure. These features may rely on the analysis of noise, spectrum, and VoIP packet loss in an audio signal of a call. For a given pair of source and destination telephony infrastructures, the audio features of calls from the source to the destination are almost invariant. Additionally they are spatially much closer than audio features of calls from a different source or destination.

If a caller uses the same telephony infrastructure for different calls, but hides behind different phone numbers (by spoofing or using a block of numbers for example) and the calls are destined for an example honeypot, the calls' audio features may be almost identical. The features from these calls from different source phone numbers playing the same recording are then labeled as the positive class and serve as input to a classifier. The negative class contains the audio features from calls corresponding to other scam or spam campaigns.

In machine learning, support vector machines (SVMs) are supervised learning models used for classification and regression analysis. Given a labeled training set, an SVM training algorithm builds a linear model that assigns new examples into one category or another. However, kernel methods allow linear classifiers to separate classes by non-linear boundaries. These methods operate in a high-dimensional, implicit feature space by only computing the inner products between the mapping of all pairs of data points in the selected feature space. Kernel methods can turn any linear model into a non-linear model by applying the kernel trick to the model. While N points usually cannot be linearly separated in d<N dimensions, they will almost always be linearly separated in d≥N dimensions.

To uniquely "phoneprint" the audio features from a cluster of recordings, a kernel SVM is trained. The output of spectral clustering, i.e. the clusters, are used to label the transcripts and train several phoneprints as illustrated in FIGS. 1 and 2 (107, 208). These phoneprints may be saved to persistent storage as shown in FIG. 1 (108) and used to identify telephone calls that originate from the same infrastructure even if the source telephone numbers are different as illustrated in FIG. 2 (209).

For one phoneprint, the audio features of one call cluster may be labeled the positive class, whereas the audio features from any other calls not in this particular class may be labeled as the negative class. A phoneprint may be a non-linear classifier that distinguishes the audio features of two classes. One class may correspond to calls from a given telephony infrastructure and the other class may correspond to calls from any other infrastructure. Good phoneprint performance that shows a high True Positive Rate (TPR) and a low False Positive Rate (FPR) indicates that the audio features of the two classes can be well separated. Calls that have audio features in the positive class may be assumed to originate from one telephony infrastructure. Poor phoneprint performance may indicate that calls from the positive class may not originate from the same infrastructure or that some calls in the negative class actually come from the same infrastructure as those in the positive class.

Typically, a phoneprint may be applied to all calls from a given source phone number. If the phoneprint from one source phone number has good performance, an example system may assume that no other calls from the same telephony infrastructure were placed under other source phone numbers. Good performance may be measured by determining whether the phoneprint classifier can find a good nonlinear boundary to separate audio features of calls from a given source from calls from other sources.

In some embodiments, several audio samples may be needed to perform cross validation and ensure performance of the classifier. It is not enough to train a single phoneprint since most sources only call into a honeypot less than twice. If several sources play the same recording, an example embodiment may assume that either a bad actor owns a block of source phone numbers or that a bad actor is spoofing source numbers.

An example embodiment uses phoneprinting clusters to determine whether several calls from different phone numbers are actually placed from the same telephony infrastructure such as a landline in Atlanta or a specific call center in India. The audio features from a call cluster from different source phone numbers that appear to have similar features may be labeled as a positive class to phoneprint the call cluster. These phoneprinted call clusters may then be used to determine telephone calls that originate from the same infrastructure in order to identify robocallers and spam and fraud campaigns regardless of the telephone number source.

An example embodiment may be used to determine certain spam campaigns based on timing of calls. To detect such a campaign, an example embodiment may determine transcripts from sources that may cluster together. Some of the sources may call a honeypot regularly year round, whereas others only place calls during a few days. For a Bahamas cruise spam campaign, for example, calling may become very active during a certain time period. People may be more interested in a free cruise at a certain time, such as right before the holidays. By reviewing timing of calls, an example embodiment may be able to make a more accurate determination regarding whether the calls are from robocallers and/or spam and fraud campaigns.

Figure 5:
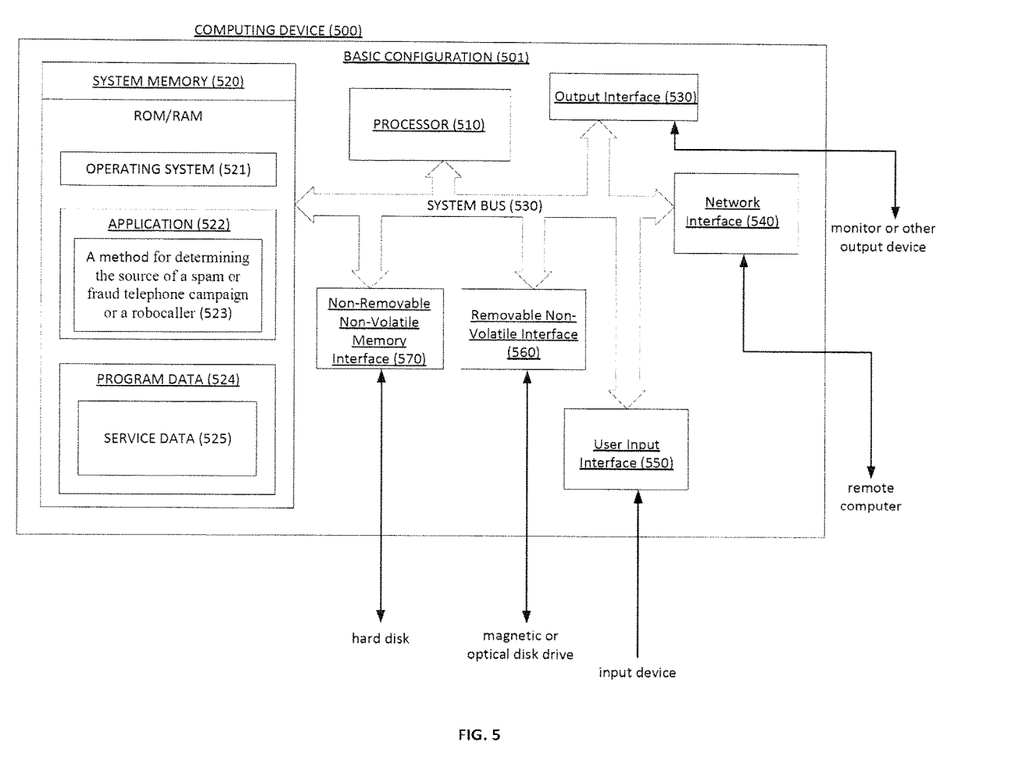
FIG. 5 is a block diagram illustrating an example computing device.

FIG. 5 is a high-level block diagram of an example computer (500) that is arranged for determining the source of a spam or fraud telephone campaign or a robocaller. In a very basic configuration (501), the computing device (500) typically includes one or more processors (510) and system memory (520). A system bus (530) can be used for communicating between the processor (510) and the system memory (520).

Depending on the desired configuration, the processor (510) can be of any type including but not limited to a microprocessor (µP), a microcontroller (µC), a digital signal processor (DSP), or any combination thereof. The processor (510) can include one more levels of caching, a processor core, and registers. The processor core can include an arithmetic logic unit (ALU), a floating point unit (FPU), a digital signal processing core (DSP Core), or any combination thereof. A memory controller can also be used with the processor (510), or in some implementations the memory controller can be an internal part of the processor (510).

Depending on the desired configuration, the system memory (520) can be of any type including but not limited to volatile memory (such as RAM), non-volatile memory (such as ROM, flash memory, etc.) or any combination thereof. System memory (520) typically includes an operating system (521), one or more applications (522), and program data (524). The application (522) may include a method for determining the source of a spam or fraud telephone campaign or a robocaller. Program Data (524) includes storing instructions that, when executed by the one or more processing devices, implement a system and method for determining the source of a spam or fraud telephone campaign or a robocaller. (423). In some embodiments, the application (522) can be arranged to operate with program data (524) on an operating system (521).

The computing device (500) can have additional features or functionality, and additional interfaces to facilitate communications between the basic configuration (501) and any required devices and interfaces, such non-removable non-volatile memory interface (570), removal non-volatile interface (560), user input interface (550), network interface (540), and output peripheral interface (530). A hard disk drive may be connected to the system bus (530) through a non-removable memory interface (570). A magnetic or optical disk drive may be connected to the system bus (530) by the removable non-volatile interface (560). A user of the computing device (500) may interact with the computing device (500) through input devices such as a keyboard, mouse, or other input peripheral connected through a user input interface (550). A monitor or other output peripheral device may be connected to the computing device (500) through an output interface (530) in order to provide output from the computing device (500) to a user or another device.

System memory (520) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device (500). Any such computer storage media can be part of the device (400).

The computing device (500) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (500) can also be implemented as a personal computer including both laptop computer and non-laptop computer configurations. Additionally, the computing device (500) may operate in a networked environment where it is connected to one or more remote computers over a network using the network interface (550).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, fiuriiware, or virtually any combination thereof. Those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method to identify relationships among telephone calls using a telephony honeypot, the computer-implemented method comprising:
   receiving a plurality of telephone calls from a plurality of telephone numbers to a telephony honeypot;
   storing metadata associated with the plurality of telephone calls;
   storing call recordings corresponding to the plurality of telephone calls;
   creating a transcript from each call recording; and
   analyzing the transcripts to identify call clusters based on similarity of the call transcripts, each call cluster containing a subset of the plurality of telephone numbers associated with a same source based on analyzing the call transcripts.

2. The computer-implemented method of claim 1, wherein said analyzing call transcripts for similarities further comprises:
   pre-processing transcripts to filter out recordings that do not contain a pre-determined amount of semantic information;
   truncating the endings of words;
   putting the transcripts into bag-of-words form;
   using a topic modeling algorithm to map each transcript to a projection in a topic space; and
   computing a pair-wise similarity between all pairs of transcripts to create a similarity matrix that contains a similarity score between each pair of transcripts.

3. The computer-implemented method of claim 2, said computing step computing the pair-wise similarity between all pairs of transcripts to create a similarity matrix that contains a similarity score between each pair of transcripts as the cosine of the projections, which are normalized.

4. The computer-implemented method of claim 1, wherein call clusters are further identified using clustering techniques to identify related calls.

5. The computer-implemented method of claim 4, wherein the clustering technique is spectral clustering.

6. The computer-implemented method of claim 1, further comprising:
   creating a positive class with the audio features for the call cluster;
   creating a negative class with the audio features from any other calls not in the call cluster;
   training a machine learning classifier to build a model of the call cluster using their audio features; and
   classifying new telephone calls as belonging to the positive class of the model.

7. The computer-implemented method of claim 6, wherein a library of machine learning models are built and maintained for scam and robocallers.

8. A computer-implemented method for detecting new calls from an existing spam or robocaller, the method comprising:
   receiving a telephone call from a telephone number to a telephony honeypot;
   extracting call audio features from a call audio associated with a telephone call;
   classifying the call based on the call audio features using at least one machine learning model, the classification indicating that the call is related to a call cluster containing a set of telephone numbers associated with a source; and
   responsive to said classifying, identifying that the telephone number and the telephone call are from the same source as the call cluster based on the call audio features of the telephone call.

9. The computer-implemented method of claim 8, further comprising:
   storing metadata associated with the telephone call; and
   storing a call audio recording associated with the telephone call; and
   said classifying step comparing the audio features and metadata from the telephone call with the at least one machine learning model.

10. The computer-implemented method of claim 9, wherein the audio features extracted and compared include noise, spectrum, and VoIP packet loss audio features.

11. The computer-implemented method of claim 1, further comprising
    extracting audio features from each call recording;
    analyzing call transcripts for similarities;
    said identifying step combining similarity of call transcripts, metadata, semantic information, and audio features to create the call clusters; and
    phoneprinting the calls in at least one of the call clusters.

12. The computer-implemented method of claim 11, further comprising
    using the phoneprints on call clusters to determine telephone calls that originate from the same infrastructure.

13. An apparatus that identifies relationships among telephone calls using a telephony honeypot, comprising:
    at least one processor; and
    a non-transitory computer-readable medium coupled to the at least one processor having instructions stored thereon that, when executed by the at least one processor, causes the at least one processor to:
      receive a plurality of telephone calls from a plurality of telephone numbers to a telephony honeypot;
      store metadata associated with the plurality of telephone calls;
      store call recordings corresponding to the plurality of telephone calls;

create a transcript from each call recording; and analyze the transcripts to identify call clusters based on similarity of the call transcripts, each call cluster containing a subset of the plurality of telephone numbers associated with a same source based on analyzing the call transcripts.

14. The apparatus of claim 13, wherein the at least one processor is further caused to perform said analyzing call transcripts for similarities by:

pre-processing transcripts to filter out recordings that do not contain a pre-determined amount of semantic information;

truncating the endings of words;

putting the transcripts into bag-of-words form;

using a topic modeling algorithm to map each transcript to a projection in a topic space; and computing a pair-wise similarity between all pairs of transcripts to create a similarity matrix that contains a similarity score between each pair of transcripts as the cosine of the projections, which are normalized.

15. The apparatus claim 13, wherein the at least one processor is further caused to further identify call clusters using clustering techniques to identify related calls.

16. The apparatus of claim 15, wherein the clustering technique is spectral clustering.

17. The apparatus of claim 13, herein the at least one processor is further caused to:

create a positive class with the audio features for the call cluster;

create a negative class with the audio features from any other calls not in the call cluster;

train a machine learning classifier to build a model of the call cluster using their audio features; and classify new telephone calls as belonging to the positive class of the model.

18. The apparatus of claim 17, wherein a library of machine learning models are built and maintained for scam and robocallers.

19. An apparatus for detecting new calls from an existing spam or robocaller, the apparatus comprising:

at least one processor; and a non-transitory computer-readable medium coupled to the at least one processor having instructions stored thereon that, when executed by the at least one processor, causes the at least one processor to:

receive a telephone call from a telephone number to a telephony honeypot;

extract call audio features from a call audio associated with a telephone call;

classify the call based on the call audio features using at least one machine learning model, the classification indicating that the call is related to a call cluster containing a set of telephone numbers associated with a source; and responsive to said classifying, identify that the telephone number and the telephone call are from the same source as the call cluster based on the call audio features of the telephone call.

20. The apparatus of claim 18, wherein the at least one processor is further caused to:

store metadata associated with the telephone call; and store a call audio recording associated with the telephone call; and said classifying step comparing the audio features and metadata from the telephone call with the at least one machine learning model.

21. The apparatus of claim 20, wherein the audio features compared include noise, spectrum, and VoIP packet loss audio features.

22. The apparatus of claim 13, wherein the at least one processor is further caused to:

extract audio features from each call recording;

analyze call transcripts for similarities;

said identifying step combining similarity of call transcripts, metadata, semantic information, and audio features to create the call clusters; and phoneprinting the calls in at least one of the calls in the call cluster.

23. The apparatus of claim 22, wherein the at least one processor is further caused to:

use the phoneprints on call clusters to determine telephone calls that originate from the same infrastructure.

* * * * *